US011146641B2

(12) United States Patent
Shao

(10) Patent No.: US 11,146,641 B2
(45) Date of Patent: *Oct. 12, 2021

(54) INTERNET OF THINGS INFORMATION SYSTEM

(71) Applicant: Chengdu Qinchuan IoT Technology Co., Ltd., Chengdu (CN)

(72) Inventor: Zehua Shao, Chengdu (CN)

(73) Assignee: Chengdu Qinchuan IoT Technology Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,658

(22) Filed: May 27, 2020

(65) Prior Publication Data

US 2020/0287972 A1  Sep. 10, 2020

Related U.S. Application Data

(63) Continuation of application No. 15/776,389, filed as application No. PCT/CN2016/105863 on Nov. 15, 2016, now Pat. No. 10,708,364.

(30) Foreign Application Priority Data

Nov. 18, 2015  (CN) .......................... 201510795697.0

(51) Int. Cl.
*H04L 29/08*  (2006.01)
(52) U.S. Cl.
CPC ............ *H04L 67/125* (2013.01); *H04L 29/08* (2013.01); *H04L 67/12* (2013.01)

(58) Field of Classification Search
USPC ........................................................ 709/223
See application file for complete search history.

(56) References Cited

U.S. PATENT DOCUMENTS

2015/0097695 A1*  4/2015  Laval ...................... H04L 69/03
340/870.02
2017/0006595 A1*  1/2017  Zakaria ................... H04W 4/80

* cited by examiner

*Primary Examiner* — Hermon Asres
(74) *Attorney, Agent, or Firm* — Getech Law LLC; Jun Ye

(57) ABSTRACT

The present invention relates to the technical field of internet of things transmission. Disclosed is an internet of things information system. The internet of things information system of the present invention comprises an object platform, a sensing network platform, and an operator management platform; the object platform establishes a communication protocol with the operator management platform through the sensing network platform; the object platform comprises a perception information system and a control information system; the perception information system acquires perception information of the object platform; the control information system controls objects by control information; the sensing network platform comprises a perception information communication system and a control information communication system; and the operator management platform comprises a perception information management system and a control information management system. The internet of things information system provided by the present invention is simple in structure and diversified in transmission process, can be applied to all kinds of internet of things application systems, and is wide in application range.

16 Claims, 1 Drawing Sheet

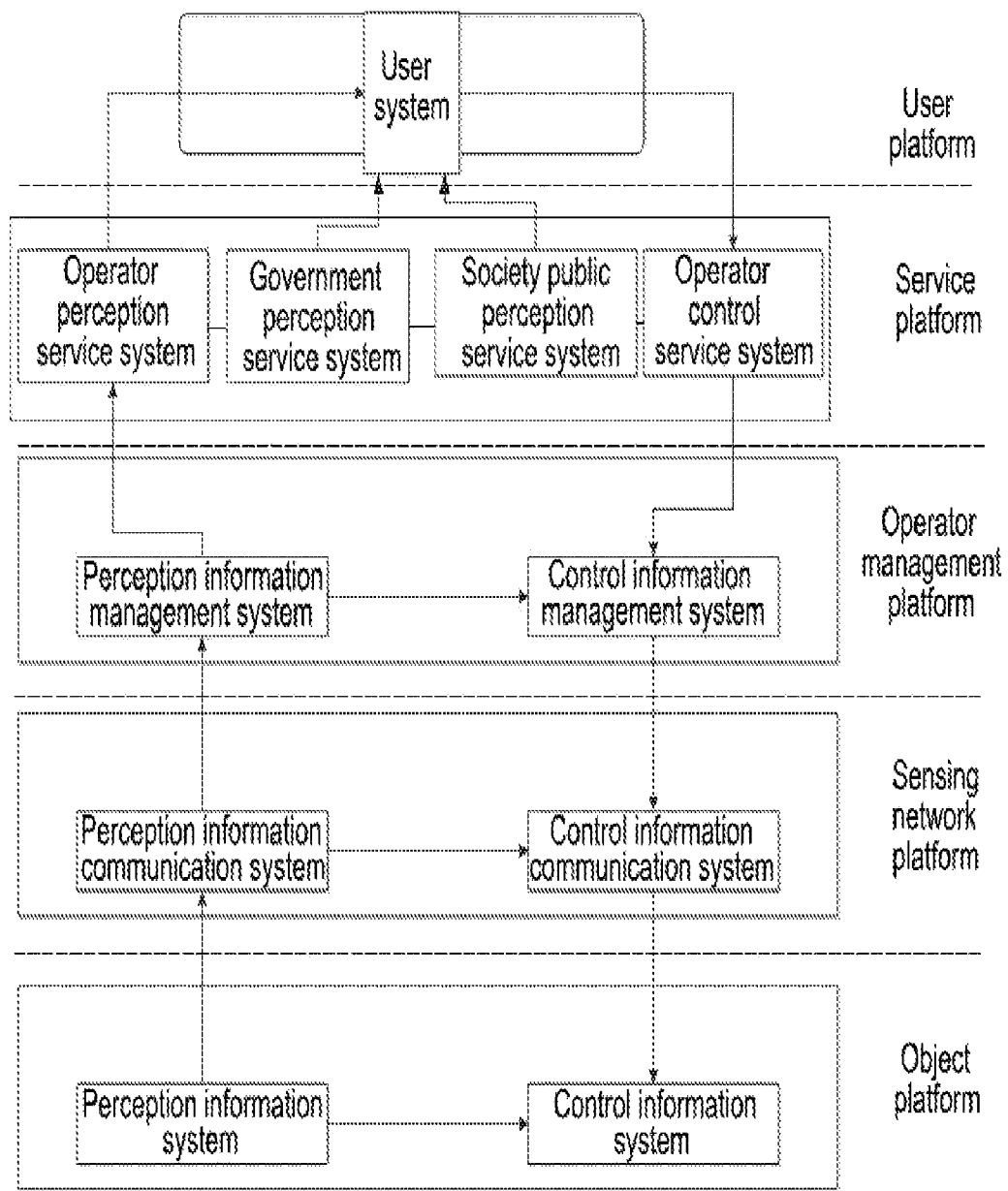

INTERNET OF THINGS INFORMATION SYSTEM

CROSS-REFERENCE TO RELATED APPLICATION(S) INFORMATION

This application is a continuation of U.S. patent application Ser. No. 15/776,389, filed May 15, 2018; which claims the benefit of and priority to a 371 U.S. National Phase application, International PCT Patent Application No. PCT/CN2016/105863, filed Nov. 15, 2016; which claims the benefit of and priority to Chinese Patent Application No. 201510795697.0, filed Nov. 18, 2015; all of which are incorporated herein by reference in their entirety.

TECHNICAL FIELD

The present disclosure relates to an internet-of-things transmission technology, and particularly the present disclosure relates to an internet-of-things information system.

BACKGROUND ART

Internet of things (IOT) is a significant component of the information technology of the new generation, and also represents an important development stage in the "informatization" era. It is now generally believed that Internet of things is an internet where objects are linked together and is an upgraded internet resulted from internet development. There are two meanings behind it. First, internet is still the core and base for Internet of things which is a network extended and expanded on the basis of internet. Second, its user terminal extends and expands among any objects for information exchange and communication, meaning that objects are linked together.

Currently, one of the most commonly used architecture of Internet of things is three-layer architecture wherein the Internet of things is divided into three layers, including a perception and control layer, a network transmission layer and an application service layer.

By analysis, we found that the architectures included in the reference framework are all functional structures of Internet-of-things products. Different classifications by functions result in different structures, and for different countries, different industries and different organizations, different Internet-of-Things architectures may be provided. Functional structures of Internet-of-things products in essence reflect the functions of Internet-of-things information, but do not show the common features of Internet-of-things information systems.

State Intellectual Property Office of China published on Nov. 7, 2012 a patent for invention (Publication No.: CN102769635A), entitled "An Internet of Things System and the Implementation Method of the Same". This patent for invention includes a perception and control layer, a transmission layer and an application layer. The implementation method thereof includes the following steps: a user logging in the Internet-of-things system via an Internet-of-things browser by a user account and entering in an address bar the registered domain name of a certain perception and control component under his/her administration; the domain server analyzing the above registered domain name and the Internet-of-things browser loading the physical page (object page) corresponding to the perception and control component; the Internet-of-things browser loading corresponding quantum objects from a quantum piece server according to the physical page elements on the corresponding physical page; the perception module timely acquiring perception information which is sent to the Internet-of-things browser via the transmission layer; the Internet-of-things browser processing the perception information by the respective quantum objects; and the Internet-of-things browser timely displaying the perception information processed by the quantum objects.

As can be seen, the Internet of things currently widely applied to various fields primarily consists of a perception layer, a transmission layer and an application layer. In the aspect of information circulation, the information circulation paths in the existing Internet-of-things structures are too monotonous, limited, not secure enough and unfavorable for users to control and manage the operation objects. For these reasons, it is necessary to study and improve the method of information circulation in the existing Internet of things.

SUMMARY

To overcome the defects and deficiencies existing in the prior art, the present disclosure provide an Internet-of-things information system. The object of the present disclosure is to solve the technical problems that in the prior art the information circulation in the Internet of things is limited, that the circulation paths are monotonous, and that it is impossible to effectively manage the perception information and the control information at the various links of information circulation.

The present disclosure solves the above defects and problems existing in the prior art by the following technical solutions.

An internet-of-things information system, including an object platform, a sensing network platform and an operator management platform, where a communication protocol is established between the object platform and the operator management platform through the sensing network platform, the object platform comprises an perception information system and a control information system, the perception information system acquires perception information of the object platform, the control information system controls an object via control information, the sensing network platform comprises a perception information communication system and a control information communication system, the operator management platform comprises a perception information management system and a control information management system.

The Internet-of-things information system further includes a service platform, wherein a communication protocol is established between the operator management platform and the service platform via a public network.

The service platform includes an operator perception service system, an operator control service system, a government perception service system and a society public perception service system.

The Internet-of-things information system further includes a user platform, wherein a communication protocol is established between the service platform and the user platform.

The user platform includes a user system.

A few ways of information circulation in the Internet-of-things information system are given below.

(1) A communication protocol is established between the perception information system and the control information system of the object platform. The perception information system acquires information and transmits the information directly to the control information system. The object platform automatically processes and responds to the information.

(2) The perception information system of the object platform acquires information and transmits the information to the perception information management system of the operator management platform via the perception information communication system of the sensing network platform. The perception information management system transmits the information to the control information management system. The control information management system transmits the information to the control information system of the object platform via the control information communication system of the sensing network platform, enabling controlling the object.

(3) The perception information system of the object platform acquires information and transmits the information to the perception information management system of the operator management platform via the perception information communication system of the sensing network platform. The perception information management system transmits the information to the operator perception service system of the service platform.

(4) The operator perception service system transmits the information to the user system of the user platform. The user system transmits the information to the user system of the user platform of the service platform. The user system transmits the information to the operator control service system of the service platform. The operator control service system transmits the information to the control information management system. The control information management system transmits the information to the control information system of the object platform via the control information communication system of the sensing network platform, enabling controlling the object.

(5) The government perception service system and/or society public perception service system in the service platform acquires public information and transmits the public information to the user system of the user platform. The user system analyzes and processes the public information, converts it into control information, and then transmits the control information to the operator control service system of the service platform. The operator control service system transmits the control information to the control information management system. The control information management system transmits the control information to the control information system of the object platform via the control information communication system of the sensing network platform, enabling controlling the object.

(6) The operator perception service system transmits the information to the government perception service system and/or the society public perception service system. The government perception service system and/or the society public perception service system transmits the information to the user system of the user platform. The user system transmits the information to a public operator control service system of the service platform. The public operator control service system transmits the information to the operator control service system. The operator control service system transmits the information to the control information management system. The control information management system transmits the information to the control information system of the object platform through the control information communication system of the sensing network platform, enabling controlling the object.

(7) The perception information system of the object platform acquires information and transmits the information to the perception information management system of the operator management platform via the perception information communication system of the sensing network platform. The perception information management system transmits the information to the operator perception service system of the service platform. The operator perception service system transmits the information to the user system of the user platform. The user system transmits the information to the public operator control service system of the service platform. The public operator control service system transmits the information to the operator control service system. The operator control service system transmits the information to the control information management system. The control information management system transmits the information to the control information system of the object platform via the control information communication system of the sensing network platform, enabling controlling the object.

(8) The perception information system of the object platform acquires information and transmits the information to the perception information management system of the operator management platform via the perception information communication system of the sensing network platform. The perception information management system transmits the information to the operator perception service system of the service platform. The operator perception service system transmits the information to the user system of the user platform. The user system transmits the information to the operator control service system of the service platform. The operator control service system transmits the information to the control information management system. The control information management system transmits the information to the control information system of the object platform via the control information communication system of the sensing network platform, enabling controlling the object.

(9) The government perception service system and/or the society public perception service system of the service platform acquires public information and transmits the public information to the user system of the user platform. The user system transmits the public information to the public operator control service system of the service platform. The public operator control service system transmits the public information to the operator control service system. The operator control service system transmits the public information to the control information management system. The control information management system transmits the public information to the control information system of the object platform via the control information communication system of the sensing network platform, enabling controlling the object.

(10) The government perception service system and/or the society public perception service system of the service platform acquires public information and transmits the public information to the public operator control service system. The public operator control service system transmits the public information to the operator control service system. The operator control service system transmits the public information to the control information management system. The control information management system transmits the public information to the control information system of the object platform via the control information communication system of the sensing network platform, enabling controlling the object.

The perception information management system stores, identifies and analyzes the information transmitted to it.

The control information management system stores, identifies and analyzes the information transmitted to it.

The public operator control service system stores, identifies and analyzes the information transmitted to it.

The public operator control service system stores, identifies and analyzes the public information transmitted to it.

The user system stores and analyzes the information or public information it receives.

The information includes perception information and control information. During transmission from the perception information system to the control information system, the perception information is converted into control information.

The public information includes public perception information. During transmission from the government perception service system and/or society public perception service system of the service platform to the control information system of the object platform, the public perception information is converted into control information.

The perception information at least includes any one or more of sensor acquired information, label information, audio information, video information, location information and intelligent device interface information.

The public perception information at least includes any one or more of sensor acquired information, label information, audio information, video information, location information and intelligent device interface information.

Compared with the prior art, the present disclosure provides the following beneficial technical effects.

1. Current internet in essence is an electronic information transmission network. Current Internet of things-related products is in a form of things plus internet which is a way of implementation of Internet of things. Not limited to the current mindset concerning about the functions of Internet-of-things products, the present inventor thinks out of the box and first proposes an Internet-of-things information system based on a world view that an Internet of things objectively exists, wherein the transmission processes of perception information and control information form a closed loop system in the entire system, so that the information circulation in the Internet of things becomes more clear, and the risk of information being tampered is further reduced by transmission via a plurality of nodes; moreover, the perception information and the control information are transmitted in opposite directions between the object platform and the user platform via two different transmission paths, which prevents mutual interference between the perception information and the control information. Furthermore, the present disclosure provides an Internet-of-things information transmission system, which is simple in structure and diverse in transmission process, and can be suitable for various Internet-of-things application systems, enabling a wide scope of application.

2. The present disclosure further includes a service platform. The service platform is provided in the present disclosure to be connected with a public network so as to acquire public information from the public network. The service platform may acquire public information from the public network, enable controlling the object according to the public information and achieve information opening and sharing of some operator information in the Internet of things through the service platform, achieving efficient use of resources.

3. The present disclosure includes an operator management platform which enables operators to control the object platform, so as to enable information exchange between the operators and the objects and to improve the security and reliability during information transmission.

BRIEF DESCRIPTION OF DRAWINGS

In order to more clearly illustrate the technical solutions provided in the embodiments of the present disclosure, drawings required to be used in the embodiments will be briefly described below. It should be understood that the following drawing merely shows some embodiments of the disclosure and thus should not be construed as limiting the scope. Other related drawings can be obtained by those ordinarily skilled in the art according to this drawing without using any creative efforts.

FIG. 1 is a system architecture diagram of the internet-of-things information system provided by the present disclosure.

DETAILED DESCRIPTION OF EMBODIMENTS

To make the objects, technical solutions and advantages of the present disclosure more clear, the technical solutions in the embodiments of the present disclosure will be clearly and completely described with reference to the FIGURE below. Apparently, the embodiments as described are only some but not all of the embodiments of the present disclosure.

Embodiment 1

As a preferred embodiment of the present disclosure and with reference to FIG. 1 of the description, the present embodiment discloses:

in the Internet-of-things information system of the present embodiment, a communication protocol is established between the perception information system and the control information system of the object platform; the perception information system acquires information and transmits the information directly to the control information system; the object platform automatically processes and responds to the information; the perception information system acquires perception information, and processes the perception information by storing, identifying and analyzing, etc., and then transmits the processed perception information to the control information system of the object platform; the control information system converts the perception information transmitted to it into control information; the object achieves control of the control information, completing control of the object; and the object platform may achieve automatic control over itself in this way.

Embodiment 2

As another preferred embodiment of the present disclosure and with reference to FIG. 1 of the description, the present embodiment discloses:

in the Internet-of-things information system of the present embodiment, the perception information system of the object platform acquires information of the object and transmits the information to the perception information management system of the operator management platform via the perception information communication system of the sensing network platform; the perception information management system processes the information by storing, identifying and analyzing, etc., and transmits the processed information to the control information management system; the processed information is converted into control information in the control information management system; the control information management system transmits the control information obtained by conversion to the control information system of the object platform via the control information communication system of the sensing network platform; and the control information system completes control over the object through a received control information instruction.

In the present embodiment, the perception information may be location information, label information, audio information, intelligent device interface information or the combination of the above information.

Embodiment 3

In the present embodiment, the Internet-of-things information system further includes a user platform. The user platform includes a user system. In the present embodiment, the perception information system of the object platform senses an object to obtain perception information and transmits the perception information to the perception information management system of the operator management platform via the perception information communication system. The perception information management system processes the perception information transmitted to it by storing, identifying and analyzing, etc. and transmits the processed perception information to the operator perception service system in the service platform. The operator perception service system transmits the perception information to the user system of the user platform. The user system analyzes the perception information transmitted to it and then converts it into corresponding control information. The user system transmits the control information obtained by conversion to the public operator control service system. The operator control service system transmits the control information to the control information management system. The control information management system stores, identifies and analyzes the control information and then transmits the control information to the control information system of the object platform, enabling control over the object.

In the present embodiment, the perception information may be sensor acquired information, label information, audio information, video information or the combination of the above information.

Embodiment 4

In the present embodiment, the government perception service system and/or the society public perception service system acquires public information from the public network and transmits the public information to the user system. The user system analyzes the acquired public information, converts it into corresponding control information, and transmits the control information to the operator control service system of the service platform. The operator control service system stores the control information and then transmits the control information to the control information management system. The control information management system stores, identifies and analyzes the control information and then transmits the control information to the control information system of the object platform, enabling control over the object.

In the present embodiment, the public information may be price information, label information or location information, etc.

In the present embodiment, the government perception service system and/or the society public perception service system acquires price information from the public network and feeds the price information back to the user system. The user system stores and records the price information and converts the price information into a price adjustment instruction for the object to be controlled, and then transmits the price adjustment instruction to the operator control service system. The operator control service system stores and identifies the price adjustment instruction and then transmits the information to the control information management system. The operator management platform obtains the price adjustment instruction information, records the price adjustment instruction information, and then transmits it after storage to the control information system of the object platform, achieving price adjustment for the object. In the present embodiment, the control information is control instruction information corresponding to the public perception information or the perception information.

The above embodiments are preferred ones of the present disclosure, but the embodiments of the present disclosure are not limited to those embodiments. Any variations, modifications, replacements, combinations and simplifications made without departing from the spiritual essence and principle of the present disclosure shall be equivalent substitutions and thus are encompassed by the scope of protection of the present disclosure.

What is claimed is:

1. An internet-of-things information system that includes at least one processor and at least a memory, comprising:
   an object platform, comprising, a perception information system configured to acquire perception information of the object platform, and a control information system configured to controls an object via control information;
   a sensing network platform, comprising a perception information communication system and a control information communication system;
   an operator management platform, comprising a perception information management system and a control information management system;
   a service platform, comprising an operator perception service system, an operator control service system, a government perception service system and a society public perception service system,
      wherein a communication protocol is established between the object platform and the operator management platform through the sensing network platform, and the government perception service system or the society public perception service system acquires public information, and
   a user platform comprising a user system,
      wherein a communication protocol is established between the service platform and the user platform, and the government perception service system or the society public perception service system transmits the public information to the user system of the user platform after acquiring the public information, and
      wherein a communication protocol is established between the perception information system and the control information system of the object platform, wherein the perception information system acquires information and transmits the information directly to the control information system, and the object platform automatically processes and responds to the information.

2. The internet-of-things information system according to claim 1, wherein the user system analyzes and processes the public information, converts the public information into control adjustment information, and then transmits the control adjustment information to the operator control service system of the service platform.

3. The internet-of-things information system according to claim 2, wherein the operator control service system transmits the control adjustment information to the control information management system, the control information management system transmits the control adjustment information to the control information system of the object platform through the control information communication system of the sensing network platform, enabling controlling the object.

4. The Internet-of-things information system according to claim 1, wherein the public information comprises price information.

5. The internet-of-things information system according to claim 1, wherein the perception information system of the object platform acquires information and transmits the information to the perception information management system of the operator management platform via the perception information communication system of the sensing network platform, the perception information management system transmits the information to the control information management system, and the control information management system transmits the information to the control information system of the object platform through the control information communication system of the sensing network platform, enabling controlling the object.

6. The internet-of-things information system according to claim 1, wherein the perception information system of the object platform acquires information and transmits the information to the perception information management system of the operator management platform through the perception information communication system of the sensing network platform, and the perception information management system transmits the information to the operator perception service system of the service platform.

7. The internet-of-things information system according to claim 6, wherein the operator perception service system transmits the information to the user system of the user platform, the user system transmits the information to the operator control service system of the service platform, the operator control service system transmits the information to the control information management system, and the control information management system transmits the information to the control information system of the object platform through the control information communication system of the sensing network platform, enabling controlling the object.

8. The internet-of-things information system according to claim 1, wherein the information comprises perception information and control information, wherein during transmission from the perception information system to the control information system, the perception information is converted into the control information.

9. The internet-of-things information system according to claim 1, wherein the public information includes public perception information, wherein during transmission from the government perception service system and/or the society public perception service system of the service platform to the control information system of the object platform, the public perception information is converted into the control information.

10. An information transmission method for an Internet-of-Things system wherein the Internet-of-Things system for the intelligent gas meter comprises an object platform, comprising, a perception information system configured to acquire perception information of the object platform, and a control information system configured to controls an object via control information; a sensing network platform, comprising a perception information communication system and a control information communication system; an operator management platform, comprising a perception information management system and a control information management system; and a service platform, comprising an operator perception service system, an operator control service system, a government perception service system and a society public perception service system, and a communication protocol is established between the object platform and the operator management platform through the sensing network platform, the information transmission method comprises:
acquiring public information by the government perception service system or the society public perception service system
wherein the internet-of-Things system further comprises a user platform comprising a user system and a communication protocol is established between the service platform and the user platform, the information transmission method further comprising:
transmitting, by the government perception service system or the society public perception service system, the public information to the user system of the user platform after acquiring the public information, and
wherein a communication protocol is established between the perception information system and the control information system of the object platform, the information transmission method further comprising:
acquiring, by the perception information system information, and transmitting the information directly to the control information system; and automatically processing, by the object platform, and responding to the information.

11. The information transmission method according to claim 10 further comprising:
analyzing and processing the public information, by the user system, converting the public information into control adjustment information, and then transmitting the control adjustment information to the operator control service system of the service platform.

12. The information transmission method according to claim 11 further comprising:
Transmitting, by the operator control service system, the control adjustment information to the control information management system;
transmitting, by the control information management system, the control adjustment information to the control information system of the object platform through the control information communication system of the sensing network platform, enabling controlling the object.

13. The information transmission method according to claim 10, wherein the public information comprises price information.

14. The information transmission method according to claim 10 further comprising:
acquiring information, by the perception information system of the object platform, and transmitting the information to the perception information management system of the operator management platform via the perception information communication system of the sensing network platform;
transmitting, by the perception information management system, the information to the control information management system; and transmitting, by the control information management system, the information to the control information system of the object platform through the control information communication system of the sensing network platform, enabling controlling the object.

15. The information transmission method according to claim 10 further comprising:
acquiring, by the perception information system of the object platform, information and transmitting the information to the perception information management system of the operator management platform through the perception information communication system of the sensing network platform; and
transmitting, by the perception information management system, the information to the operator perception service system of the service platform.

16. The information transmission method according to claim 15 further comprising:
transmitting, by the operator perception service system, the information to the user system of the user platform;
transmitting, by the user system, the information to the operator control service system of the service platform;
transmitting, by the operator control service system, the information to the control information management system; and
transmitting, by the control information management system the information to the control information system of the object platform through the control information communication system of the sensing network platform, enabling controlling the object.

* * * * *